United States Patent [19]

Aoki et al.

[11] 4,326,127
[45] Apr. 20, 1982

[54] FOCUS DETECTING DEVICE

[75] Inventors: Harumi Aoki, Kiyose; Yoshio Sawada, Tokyo, both of Japan

[73] Assignee: Asahi Kogaku Kogyo Kabushiki Kaisha, Tokyo, Japan

[21] Appl. No.: 149,803

[22] Filed: May 14, 1980

[30] Foreign Application Priority Data

Jun. 18, 1979 [JP] Japan ................. 54-76578

[51] Int. Cl.³ .............................................. G01J 1/20
[52] U.S. Cl. .................................... 250/204; 250/201
[58] Field of Search ................. 250/204, 201; 354/25; 356/4

[56] References Cited

U.S. PATENT DOCUMENTS

4,203,031  5/1980  Kamachi et al. ................. 250/201

Primary Examiner—David C. Nelms
Assistant Examiner—Darwin R. Hostetter
Attorney, Agent, or Firm—Sughrue, Mion, Zinn, Macpeak & Seas

[57] ABSTRACT

A focus detecting device for a camera utilizing a self-scanning type photoelectric element array composed of a plurality of minute photoelectric elements. The input signal from the photoelectric element array is held by first and second memory circuits at opposite phases from one another with the holding time for the memory circuit corresponding to twice the scanning time for a single minute photoelectric element within the array. Signals representing the difference and sum of the output of the memory circuits are formed and the absolute value of the difference signal is taken. The sum signal is connected as the divisor signal to a divider circuit while the absolute value of the difference is utilized as the dividend. The peak value of the signal thus formed is utilized as a contrast detection signal. This signal is substantially unaffected by vibration of the camera or movement of the object being photographed.

4 Claims, 18 Drawing Figures

FOCUS DETECTING DEVICE

BACKGROUND OF THE INVENTION

The present invention relates to a device for detecting a properly focused state by utilizing the fact that the contrast of the image of an object to be photographed is a maximum when the lens is in focus.

It is a property of an optical image of an object formed by a lens that its contrast, that is, the difference between lighted and shaded areas of the image, is a maximum when the lens is in focus. This phenomenon is attributed to the fact that the optical intensities (power spectrum) of spatial frequencies of an object to be photographed are a maximum when the lens is in focus. Therefore, if the maximum contrast position can be detected, according to this phenomenon, then the correct focus can be detected. A variety of automatic focus control devices utilizing this phenomenon have been proposed in the art.

Recently, a technique has been proposed in which a self-scanning type photoelectric element is provided for detecting contrast data. With this technique, a self-scanning type photoelectric element array made up of a plurality of microphotoelectric elements and a scanning circuit are arranged in an optical image forming plane and the optical image is electrically scanned to extract contrast data of the optical image.

A variety of techniques for electrically processing the output signal of the self-scanning type photoelectric element array so as to extract contrast data therefrom have also been proposed in the art. In Japanese Patent Application Nos. 107354/1978 and 164960/1978 corresponding to U.S. Patent application Ser. No. 102,071, filed Dec. 10, 1979 by the present inventor and which are here not mentioned as prior art but only to aid in a full understanding of the present invention, there is disclosed a device in which the output of each of the microphotoelectric elements forming the self-scanning type photoelectric element array is stored for one cycle time and the difference between the output thus stored and the output of a microphotoelectric element adjacent to or near the first minute photoelectric element is formed thereby providing a signal representing the contrast of the optical image. This device is advantageous compared to a device utilizing a conventional method in which a differentiation circuit is used to compute the differentiation value of the optical image. The detection method utilized by the device of the aforementioned patent applications will be referred to as "a difference output detecting method" hereinafter.

According to the difference output detecting method, as the contrast of an optical image decreases, the absolute value of the difference output also decreases. Automatic focus detection can be implemented by utilization of this variation. However, it should be noted that, as the average illuminance of the optical image varies, the difference output also varies. On the other hand, if the scanning speed of the self-scanning type photoelectric element array is maintained constant, then it is sometimes impossible to detect the difference output because the output of the element becomes saturated or is so low as to be masked by noise since the dynamic range of photoelectric output with respect to the quantity of light of such elements is typically not very wide.

In order to solve both of these two problems, a technique has been proposed in the art in which the scanning speed of the self-scanning type photoelectric element array is changed according to the average illuminance of the optical image applied to the element. That is, as the average illuminance of the optical image increases, the scanning speed is increased and, as the average illuminance decreases, the scanning speed is decreased so that the dynamic range of the device is increased and variations of the difference output due to variations of the average illuminance are prevented. In order to detect the average illuminance, a single photoelectric conversion element (hereinafter referred to as "an average illuminance detecting element" and the corresponding method will be referred to as "an illuminance compensation method" when applicable) is arranged near the self-scanning type photoelectric element array.

With the illuminance compensation method using the average illuminance detecting element applied to the above-described difference output detecting technique, a difference output independent of variations of the average illuminance can be obtained if the optical image is at rest. However, the difference output is changed if the optical image is moved perpendicularly to the optical axis. An ordinary camera is often held by hand and most of the objects photographed are in motion. In addition, the range of brightness of an object to be photographed is usually relatively wide. Accordingly, application of a focus detecting device using the self-scanning type photoelectric element array to an ordinary camera is disadvantageous in that the output varies even if the above-described illuminance compensation method is employed.

Accordingly, an object of the invention is to provide a focus detecting device in which all of the above-described difficulties have been eliminated and, although the specific feature of the technique for extracting the difference output of two microphotoelectric elements using a self-scanning type photoelectric element array is utilized, output variations due to variations in brightness of an object to be photographed are eliminated and no output variations are caused by shaking the camera or by movement of the object.

Another object of the invention is to provide a focus detecting device in which the dynamic range of photoelectric element characteristics with respect to the quantity of light is increased so that a contrast signal of sufficiently high amplitude can be obtained not only from objects of low brightness but also from objects of very high brightness.

SUMMARY OF THE INVENTION

These, as well as other objects of the invention, are met by an automatic focus detecting device for a camera including a self-scanning type photoelectric element array having a plurality of microphotoelectric elements. The self-scanning type photoelectric element is disposed in the optical system of the camera at a position equivalent to that of the image forming plane of the camera, that is, at a position equivalent to the film surface upon which the viewed images are focused. A first memory circuit is provided which holds the output signal from the photoelectric element corresponding to a single microphotoelectric element therein for a first predetermined period of time corresponding to the time alloted the signal from a single microphotoelectric element during the scanning of the self-scanning type photoelectric element. A second memory circuit holds the output signal of the self-scanning type photoelectric element in the same way as that of the first memory circuit except at the opposite phase. A calculation circuit is provided which produces an output signal corresponding to the difference between the output of the two memory circuits divided by the sum thereof. A peak value detecting circuit produces a signal representing the peak value of the output signal of the calculation circuit over one scanning period.

The calculation circuit preferably includes two sample-and-hold circuits having inputs coupled to receive the outputs of the self-scanning type photoelectric element with timing pulses supplied to the two sample-and-hold circuits supplied at opposite phases. Signals representing the difference and sum of the output of the sample-and-hold circuits are formed. The sum signal forms the divisor signal coupled to a divider circuit while the absolute value of the difference signal is coupled as the dividend signal.

BRIEF DESCRIPTION OF THE DRAWINGS

FIGS. 10A–10F are timing diagrams showing various waveforms in the focus detecting device as shown in FIG. 9.

DESCRIPTION OF THE PREFERRED EMBODIMENTS

The invention will be described with reference to the accompanying drawings.

Figure 1:
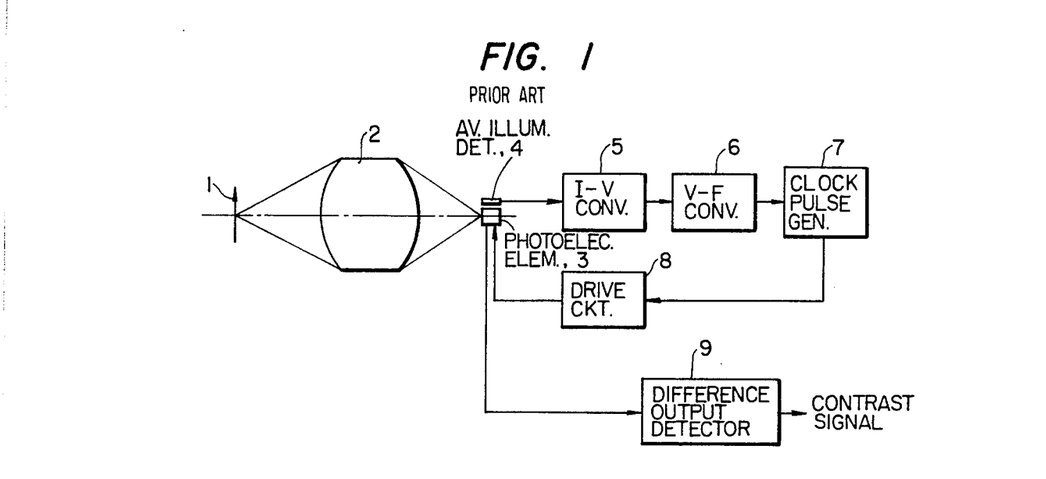
FIG. 1 is a block diagram of an example of a conventional focus detecting device which utilizes a difference output detection technique in which illuminance compensation is effected.
Figure 2:
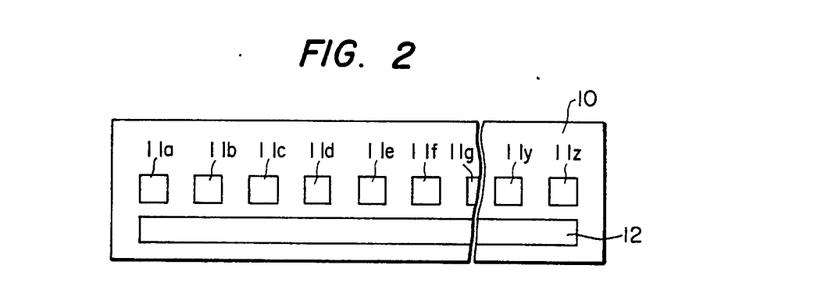
FIG. 2 is a diagram showing the configuration of a photoelectric conversion element section in the device shown in FIG. 1.

FIG. 1 is a block diagram of a conventional focus detecting device in which a "brightness compensation method" is applied to a "difference output detection method". The image of an object 1 is formed on a self-scanning type photoelectric element array 3 by a lens 2. An average illuminance detecting element 4 is disposed in the same plane as the self-scanning type photoelectric element 3. Optical current produced by the average illuminance detecting element 4 is converted into a voltage signal by a current-to-voltage conversion circuit 5. The voltage signal is converted into a frequency signal wherein amplitude variations in the voltage signal become frequency variations by a voltage-to-frequency conversion circuit 6. The output of the voltage-to-frequency conversion circuit 6 is converted into a train of pulses of variable frequency by a clock pulse generating circuit 7. The train of pulses is applied to a drive circuit 8 where it is converted into scanning pulses which are adapted to drive the self-scanning type photoelectric element array 3. The image of the object is photoelectrically scanned by the self-scanning type photoelectric element 3 array as a result of which a time series output signal from the element corresponding to the brightness distribution of the image is produced. The contrast signal of the image is extracted from the time series photoelectric element output signal by a suitable difference output detecting circuit 9. For instance, a circuit as described in the specification of one of the aforementioned Japanese Patent Applications may be employed as the difference output detecting circuit 9. An example of the construction of a photoelectric conversion element section in a device as disclosed by these Japanese Patent Applications is shown in FIG. 2. A plurality of microphotoelectric elements $11a$ through $11z$ are arranged on a photoelectric element substrate 10 and an average illumination detector is disposed to one side of and running along the microphotoelectric elements. The microphotoelectric elements and a scanning circuit (not shown) form a self-scanning type photoelectric element array. In the device, as the average illuminance of the image of an object increases, the self-scanning type photoelectric element array 3 can be driven at high speeds. Therefore, the dynamic range of the photoelectric element array is increased and a contrast signal independent of variations in the average illuminance of the image of the viewed object is provided.

Figure 3:
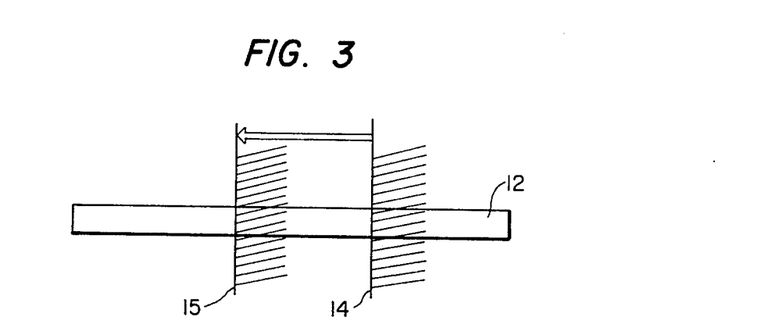
FIG. 3 is a diagram showing the displacement of the image of an object of an average illuminance detecting element.
Figure 4A:
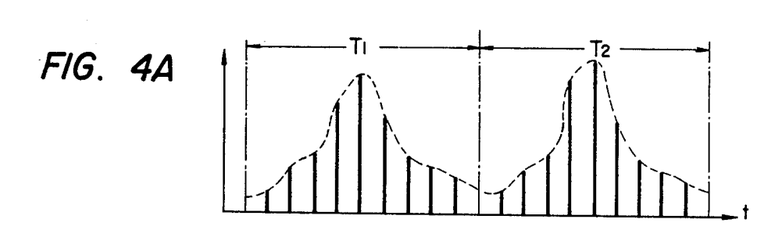
FIGS. 4A, 4B, 4C is a graphical representation illustrating a contrast signal extraction process according to a disclosed difference output detecting method.
Figure 4B:
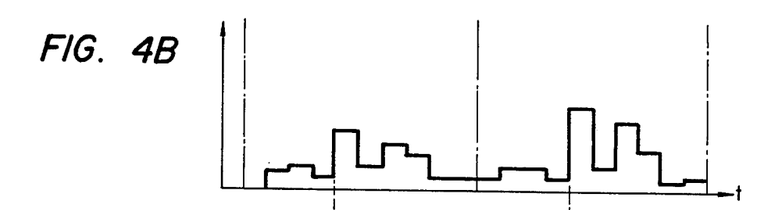
Figure 4C:
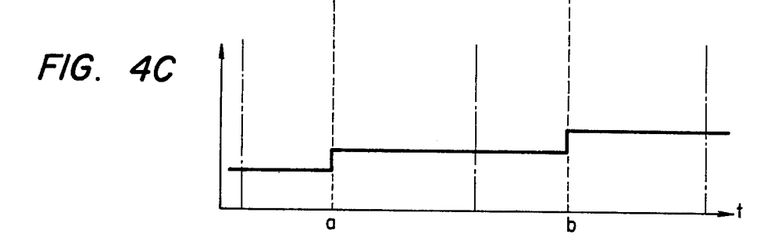

If the object is moved or the camera is shaken, then the object's image formed on the average illumination detecting element 4 or 12 is vibrated so that the photoelectric output varies correspondingly. For example, FIG. 3 shows an image 14 which is shifted appearing as an image 15 thus being moved on the average illuminance detecting element 12. When such a movement or vibration occurs, even if the contrast distribution and average brightness of the object remain unchanged, the scanning speed of the photoelectric element changes as a result of which the output contrast signal varies. FIGS. 4A–4C are a series of waveforms illustrating contrast signal extracting process as carried out by a circuit such as that described in the aforementioned Japanese Patent Application No. 107354/1978 employed as the difference output detecting circuit 9. FIG. 4A illustrates the discrete photoelectric outputs of the self-scanning type photoelectric element during the scanning periods $T_1$ and $T_2$. The dotted line represents the intensity distribution of the image of the viewed object. From this diagram it may be seen that the image in the scanning period $T_2$ is closer to the focus position than the image in the scanning period $T_1$. FIG. 4B shows the absolute value of a difference output taken between adjacent microphotoelectric elements. As shown in FIG. 4C, the peak value of the difference output over a scanning period is maintained unchanged until the peak value of the difference output in the next scanning period is provided.

Figure 5A:
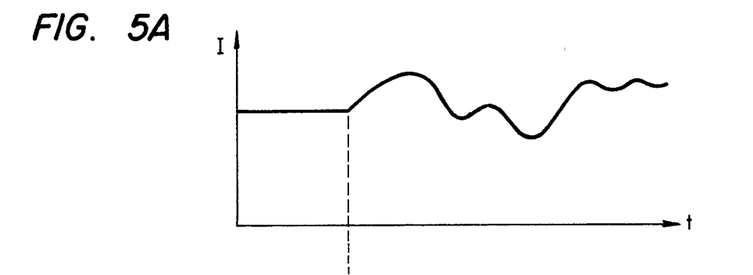
FIGS. 5A, 5B is a graphical representation for a description of the variations of the output of the device in FIG. 1.
Figure 5B:
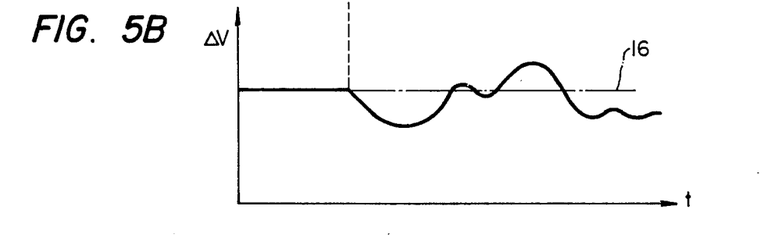

The contrast signal thus obtained varies as the photoelectric output of the average illuminance detecting element 4 or 12 is varied by movement of an object or the like as described above. Examples of variations of the contrast signal are shown in FIGS. 5A and 5B. FIG. 5A shows the variation of the output I of the average illuminance detecting element 4 or 12 as caused by movement of an object or by shaking the camera. FIG. 5B shows the waveform of a difference output V taken between microphotoelectric elements representing a contrast signal. It is desireable that the difference output V be maintained constant as long as the contrast distribution of an object is constant. However, in this case, the difference output V decreases as the output I increases.

The present invention provides a focus detecting device in which the photoelectric outputs of the microphotoelectric elements are utilized as described above but in which the contrast signal does not vary in response to vibration of an object and which is not affected by the variation in average brightness of the object.

Figure 6:
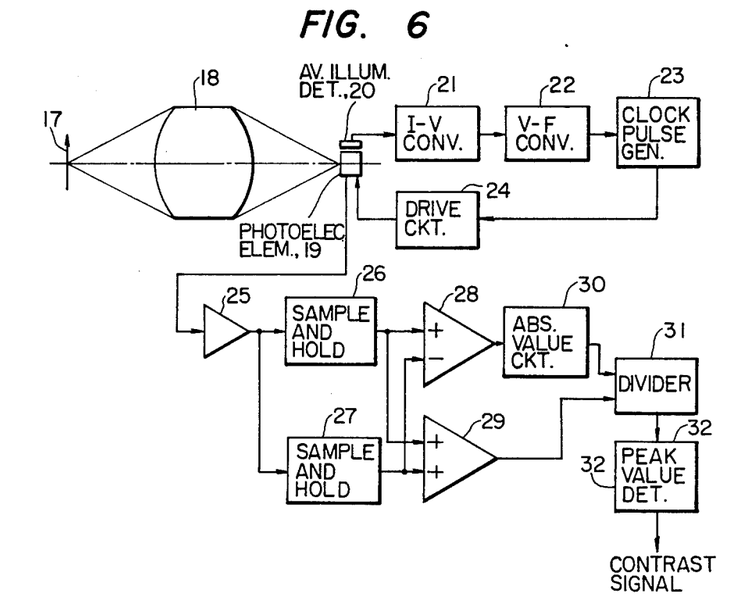
FIG. 6 is a block diagram showing a preferred embodiment of a focus detecting device of the invention.

FIG. 6 shows an example of a focus detecting device constructed according to a preferred embodiment of the invention. The image of an object 17 is formed on a self-scanning type photoelectric element array 19 by lens 18. An average illumination detecting element 20 is disposed in the vicinity of the self-scanning type photoelectric element array 19 producing an optical current corresponding to the average illuminance of the object. The optical current is converted into a voltage output signal by a current-to-voltage conversion circuit 21. The voltage output signal is converted into a frequency signal by a voltage-to-frequency conversion circuit 22. The output of the voltage-to-frequency conversion circuit 22 is converted into a train of pulses of variable frequency by a clock pulse generating circuit 23. The train of pulses is applied to a drive circuit 24 where it is converted into scanning pulses which drive the photoelectric element array 19. The technique used for generating the scanning pulses is similar to that employed in the device shown in FIG. 1. This merely increases the dynamic range of the self-scanning type photoelectric element array and is not always necessary for the device of the invention. That is, the device of the invention can be operated with the frequency of the scanning pulses fixed.

The self-scanning type photoelectric element array 19 provides a discrete time series signal corresponding to the intensity distribution of the object. The discrete time series signal, after being amplified by an amplifier circuit 25, is simultaneously applied to two sample-and-hold circuits 26 and 27. The first sample-and-hold circuit 26 holds the discrete output of every other microphotoelectric element. Similarly, the second sample-and-hold circuit 27 holds the discrete output of every other minute photoelectric element but shifted one element with respect to the first sample-and-hold circuit. The output signals of the two sample-and-hold circuits 26 and 27 are applied to a difference circuit 28 and to an addition circuit 29. The output signals applied to the difference circuit 28 are converted into a waveform corresponding to the difference between the output signals while the output signals applied to the addition circuit 29 are converted into a waveform corresponding to the sum of the two output signals. The output of the difference circuit 28 is converted into a positive waveform by an absolute value circuit 30. An analog divider circuit 31 produces a waveform corresponding to the absolute waveform divided by the sum waveform. The peak value of the output of the divider circuit 31 over a scanning period is extracted by a peak value detecting circuit 32 and is held constant until the peak value in the next scanning period is provided. The peak value waveforms forms the contrast signal.

In the above-described device constructed in accordance with the teachings of the invention, the result which is obtained by dividing the photoelectric output difference between adjacent microphotoelectric elements by the photoelectric output sum is employed as the contrast signal. Therefore, even if the average illuminance of the image of an object changes on a pair of microphotoelectric elements where the contrast signal is at its peak value, the actual value of the contrast signal extracted is not changed. Thus, in the device of the invention, unlike the device shown in FIG. 1, it is unnecessary to compensate for increases or decreases in the average brightness of an object using the average illuminance detecting element. That is, a correct contrast signal is obtained with the invention using only the self-scanning type photoelectric element array. The dynamic range of the self-scanning type photoelectric element array is increased by suitably changing the scanning speed according to the average illuminance of the object. As is clear from the above description, in accordance with the invention, the contrast signal is correctly produced whether or not there is any vibration of the image on the average illuminance detecting element. Therefore, an automatic focus detecting device having a high reliability is provided in which the above-described difficulties relating to variations of the output signal caused by vibration have been eliminated.

Figure 7:
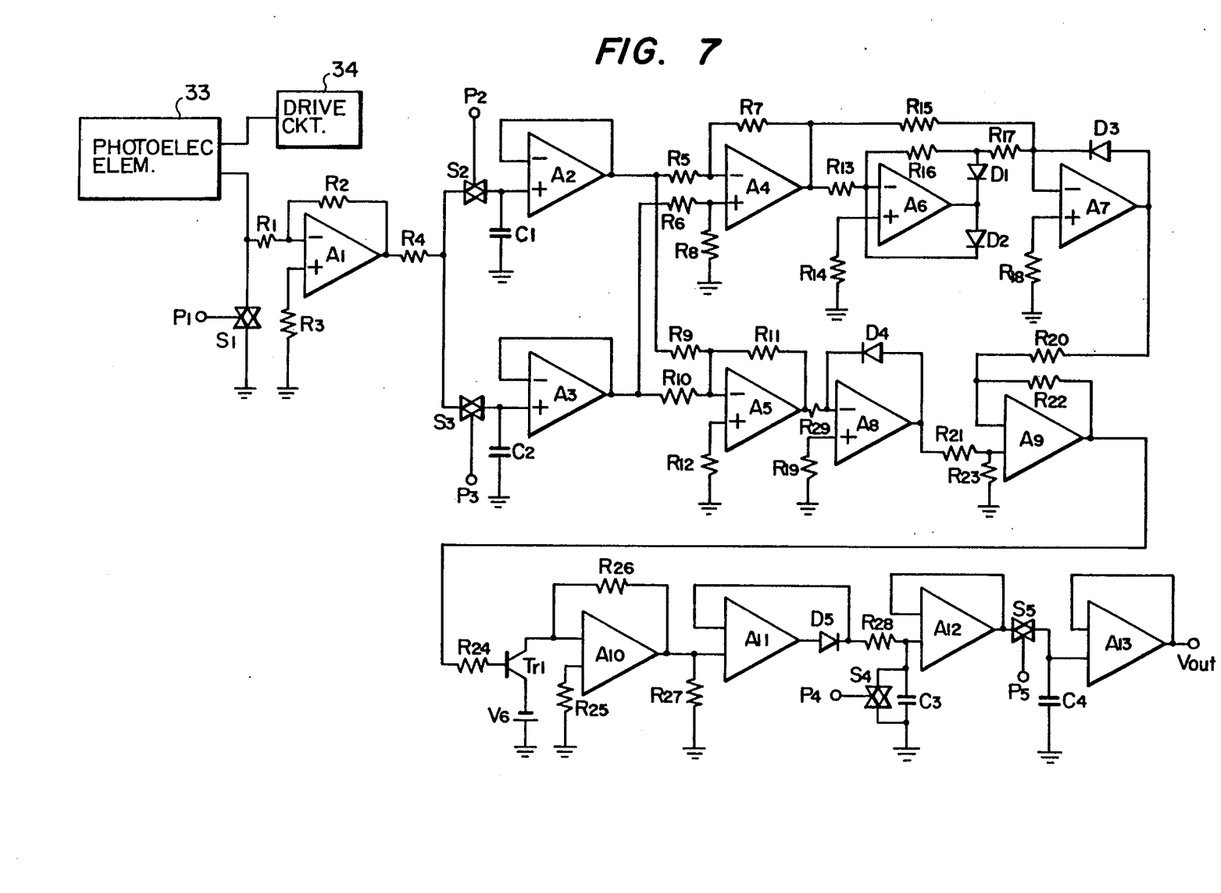
FIG. 7 is a circuit diagram showing one example of the focus detecting device according to the invention.
Figure 8:
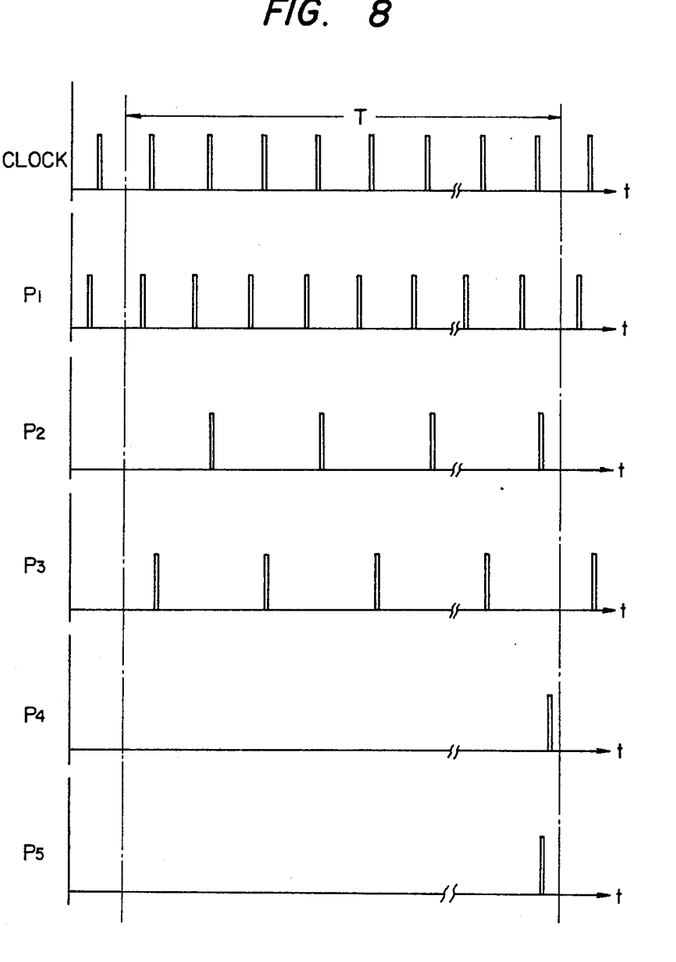
FIG. 8 is a timing chart showing drive pulses for a self-scanning photoelectric element array and control pulses for five analog switches used in the device of the invention.

FIG. 7 is a circuit diagram of the preferred embodiment of the device of the invention. FIG. 8 is a timing chart showing control pulses for analog switches $S_1$ through $S_5$ and a driving clock pulse for this self-scanning type photoelectric element array employed in the circuit in FIG. 7. In FIG. 8, reference character T designates one scanning period.

The self-scanning type photoelectric element array 33 is started by a drive circuit 34 including a pulse generator. The discrete time series output signal from the photoelectric element is amplified by an operational amplifier $A_1$. The analog switch $S_1$ controlled by the pulse $P_1$ is provided to separate the outputs of microphotoelectric elements. The amplified discrete output signal is applied to two circuits composed respectively of the analog switches $S_2$ and $S_3$ and capacitors $C_1$ and $C_2$ which form two sample-and-hold circuits and which convert the discrete output signal into two sample-and-hold signals. The sampling pulses $P_2$ and $P_3$ are as shown in FIG. 8. The sample-and-hold signals are applied through buffer amplifiers $A_2$ and $A_3$ to operational amplifiers $A_4$ and $A_5$. The operational amplifier $A_4$ produces the difference signal of the two sample-and-hold signals while the operational amplifier $A_5$ produces a signal corresponding to the sum of the two sample-and-hold signals.

The period of each of the control pulses for the analog switches $S_2$ and $S_4$ is twice as long as the period of the drive pulse used for starting the self-scanning type photoelectric element array 33. The control pulses are shifted from each other in time by one drive pulse period. The difference output is converted into a positive absolute value waveform by an operational amplifier A and diodes $D_1$ and $D_2$ and is logarithmically compressed by a circuit composed of an operational amplifier $A_7$ and a diode $D_5$. The sum signal is subjected to lagarithmic compression by an operational amplifier $A_8$ and a diode $D_4$. These two logarithmically compressed waveforms are applied to an operational amplifier $A_9$ which produces as its output the difference between the two signals. The difference signal is then expanded by a logarithmic expansion circuit composed of an operational amplifier $A_{10}$, a transistor $Tr_1$ and an electric source $V_3$. As a result, an output signal is produced which corresponds to the difference between the two sample-and-hold signals divided by the sum thereof.

The peak value in one scanning period of the expansion signal is held by a sample-and-hold circuit composed of an operational amplifier $A_{11}$, a diode $D_5$, a capacitor $C_3$ and the analog switch $S_4$ controlled by the control pulse $P_4$. The peak value, after passing through a buffer amplifier implemented by an operational amplifier $A_{12}$, is held by a circuit including a buffer amplifier, a capacitor $C_4$ and the analog switch $S_5$ controlled by the control pulse $P_5$ until the peak value in the following period appears. The output signal $V_{out}$ thus produced serves as the contrast signal which is utilized for focus detection.

As is apparent from the above description, a specific feature of the invention resides in that a self-scanning type photoelectric element array composed of a plurality of microphotoelectric elements is employed so that the signal which is obtained by dividing the difference in outputs signals between two of the microphotoelectric elements by the sum of the signals is produced and the peak value of the quotient signal from scanning period to scanning period is employed as the contrast signal. With this invention, as long as the contrast of the image of an object remains unchanged, the contrast signal remains unchanged even if the brightness of the object changes or the image of the object is vibrated by shaking the camera.

The above-described device according to the preferred embodiment of the invention utilizes the adjacent microphotoelectric element photoelectric output extracting technique disclosed in the aforementioned Japanese Patent Application No. 10735/1978. However, the same effect can be obtained by utilizing the photoelectric outputs of microphotoelectric elements selected every other mictrophotoelectric element as disclosed by the aforementioned Japanese Patent Application No. 164960/1978. This focus detecting operation will be described with reference to FIGS. 9 and 10.

Figure 9:
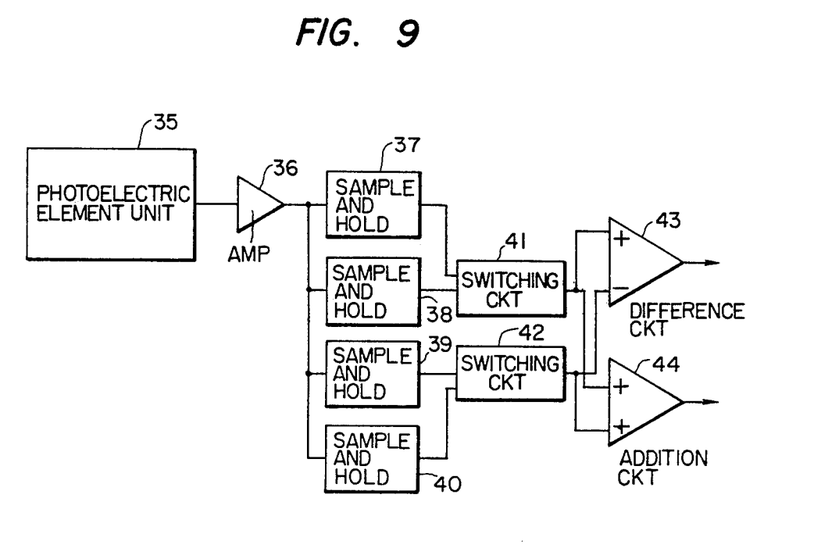
FIG. 9 is a block diagram showing another example of a focus detecting device according to the invention.
Figure 10A:
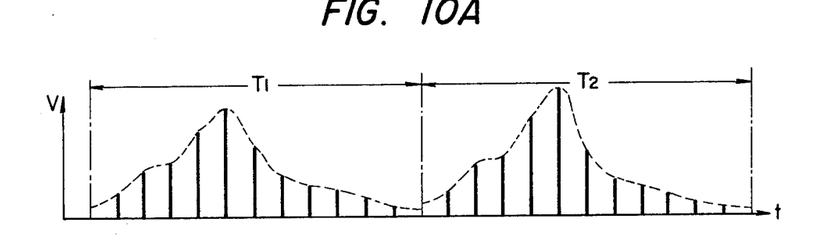
FIG. 10A shows the output waveform of a self-scanning type photoelectric element unit.
Figure 10B:
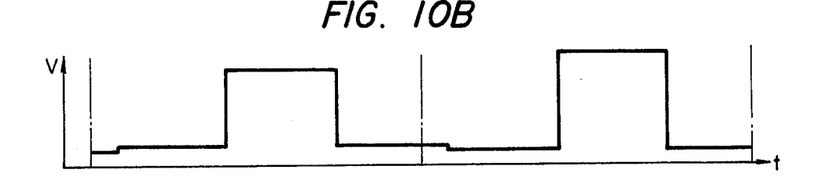
FIGS. 10B–10E first through fourth sample-and-hold waveforms, and FIG. 10F the output waveform of a difference circuit.
Figure 10C:
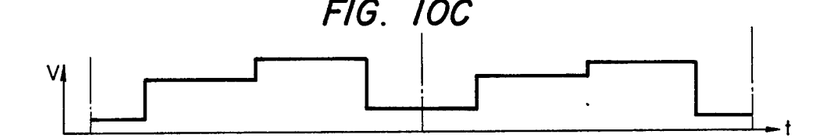
Figure 10D:
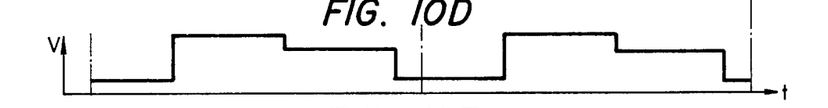
Figure 10E:
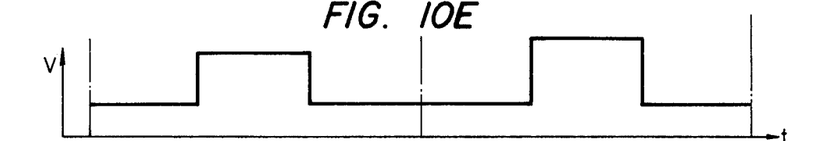

FIG. 9 is a block diagram showing one example of a memory circuit section, and FIGS. 10A through 10F are timing diagrams showing various waveforms in the focus detecting device according to the invention. Referring to FIG. 9, a self-scanning type photoelectric element unit 35 on which the image of an object is formed, generates clock pulses providing a discrete time series waveform as shown in FIG. 10A according to the brightness distribution of the image. After being amplified by an amplifier 36, the discrete waveform is applied to four sample-and-hold circuits 37 through 40 simultaneously. Sampling pulses are provided to the first sample-and-hold circuit 37 at times such that the first sample-and-hold circuit 37 holds the discrete output (shown in FIG. 10A) of every fourth microphotoelectric element as shown in FIG. 10B. Sampling pulses are applied to the second sample-and-hold circuit 38 delayed by one clock pulse, corresponding to one photoelectric element unit, from the sampling pulses coupled to the first sample-and-hold circuit 37 thereby causing the second sample-and-hold circuit 38 to hold the dicrete output every fourth microphotoelectric element shifted one element from that of the first sample-and-hold circuit 37 as shown in FIG. 10C. Similarly, the third sample-and-hold circuit 39 holds the discrete output of every fourth microphotoelectric element with a delay of one clock pulse as shown in FIG. 10D and the fourth sample-and-hold circuit holds the discrete output of every fourth microphotoelectric element with a delay of one clock pulse from the third sample-and-hold circuit as shown in FIG. 10E.

Figure 10F:
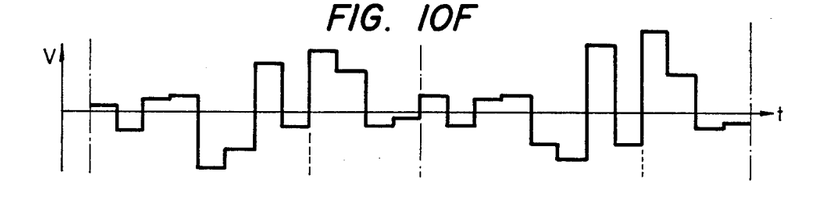

The output signals of the first sample-and-hold circuit 37 and the second sample-and-hold circuit 38 are applied to a swiching circuit 41, whereas the output signals of the third sample-and-hold circuit 39 and the fourth sample-and-hold circuit 40 are applied to a switching circuit 42. In the switching circuits 41 and 42, the two output signals are subjected to switching operations at every clock pulse. The output signals of the two switching circuits 41 and 42 are then applied to a difference circuit 43 and to an addition circuit 44. The output signals of the difference circuit 43 and the addition circuit 44 are then processed in the same proceeding as described above with reference to FIG. 6 to obtain a contrast signal. The output waveform of the difference circuit 43 is shown in FIG. 10F.

As the contrast signal is a maximum at the position of correct focus, an automatic focus detection type camera can be constructed using this contrast signal. With the device according to the invention, the adverse effects due to shaking the camera, which are often present with an ordinary camera, or due to the movement of the object are eliminated. Therefore, an automatic focus detection type camera having a quite high reliability is provided utilizing the device of the invention.

What is claimed is:

1. An automatic focus detecting device for a camera comprising:
   a self-scanning type photoelectric element array having a plurality of microphotoelectric elements, said self-scanning type photoelectric element being disposed at a position equivalent to the image forming plane of a lens;
   a first memory circuit for holding an output signal from said self-scanning type photoelectric element corresponding to a minute photoelectric element for a first predetermined period of time;
   a second memory circuit for holding an output signal from said self-scanning type of photoelectric element array corresponding to a microphotoelectric element for a second predetermined period of time spaced a third predetermined period of time from said microphotoelectric element the output of which is held by said first memory circuit;
   a calculation circuit for producing an output signal corresponding to the difference between outputs of said two memory circuits divided by the sum of said outputs; and
   a peak value detecting circuit for producing a signal representing the peak value of said output signal of said calculation circuit in one scanning period.

2. The focus detecting device as claimed in claim 1 wherein said memory circuits each comprise a sample-and-hold circuit and further comprising means for supplying sampling pulses to said sample-and-hold circuits wherein an output of an odd-numbered microphotoelectric element is held by said first sample-and-hold circuit and an output of an even-numbered microphotoelectric element is held by said second sample-and-hold circuit.

3. The focus detecting device as claimed in claim 1 wherein said memory circuits comprises first, second, third and fourth sample-and-hold circuits and further comprising means for supplying sampling pulses to said sample-and-hold circuits wherein said first sample-and-hold circuit holds an output of a 4n-th microphotoelectric element, said second sample-and-hold circuit holds an output of a 4(n+1)-th microphotoelectric element, said third sample-and-hold circuit holds an output of a 4(n+2)-th microphotoelectric element and said fourth sample-and-hold circuit holds an output of a 4(n+3)-th microphotoelectric element where n is an integer and means for switching a pair of outputs of said first and third sample-and-hold circuits and a pair of outputs of said second and fourth sample-and-hold circuits over to each other so as to be applied to said calculation circuit at a rear stage thereof whenever a driving clock pulse for said self-scanning type photoelectric element array is provided wherein said output signal of said calculation circuit between two microphotoelectric element is selected every other microphotoelectric element.

4. An automatic focus detecting device for a camera comprising:
   a self-scanning type photoelectric element having a plurality of microphototelectric elements, said self-scanning type photoelectric element being disposed at a position equivalent to the image forming plane of a lens;
   a sample switch circuit coupled to an output of said self-scanning type photoelectric element, said sample switch circuit being coupled to a source of sampling pulses having a period corresponding to the scanning time of a single microphotoelectric element of said self-scanning type photoelectric element;
   first and second sample-and-hold circuits coupled to receive an output of said sample switch circuit, said first and second sample-and-hold circuits being supplied with sampling pulses having a frequency half that of the sampling pulses supplied to said sample switch circuit and said sampling pulses supplied to said first and second sample-and-hold circuits being of opposite phase from one another;
   a first difference forming circuit having one input coupled to receive an output of said first sample-and-hold circuit and a second input coupled to receive an output of said second sample-and-hold circuit, said first difference circuit producing a signal representing the difference in said outputs from said first and second sample-and-hold circuits;
   a sum circuit coupled to receive said outputs of said first and second sample-and-hold circuits, said sum circuit producing an output signal representing the sum of said output signals of said first and second sample-and-hold circuits;
   an absolute value circuit having an input coupled to receive said output of said first difference circuit;
   a first logarithmic compressing circuit having an input coupled to receive an output of said absolute value circuit;
   a second logarithmic compressing circuit having an input coupled to receive said output of said sum circuit;
   a second difference circuit having a first input coupled to receive an output of said first logarithmic compressing circuit and a second input coupled to receive an output of said second logarithmic compressing circuit, said second difference circuit producing a signal representing the difference between said output of said first and second logarithmic compressing circuits;
   a logarithmic expansion circuit having an input coupled to receive an output of said second difference circuit;
   a third sample-and-hold circuit having an input coupled to receive an output of said logarithmic expansion circuit, and third, sample-and-hold circuit being coupled to a source of sampling pulses having a period corresponding to the scanning period of said self-scanning type photoelectric element; and
   a fourth sample-and-hold circuit coupled to receive an output of said third sample-and-hold circuit, said fourth sample-and-hold circuit being coupled to a source of sampling pulses having a period corresponding to said scanning period of said self-scanning type photoelectric element, said sampling pulses connected to said fourth sample-and-hold circuit being supplied at times slightly before those supplied to said third sample-and-hold circuit.

* * * * *